Dec. 18, 1962   A. F. COCHRANE   3,069,036
WHEEL LIFT
Filed March 31, 1960
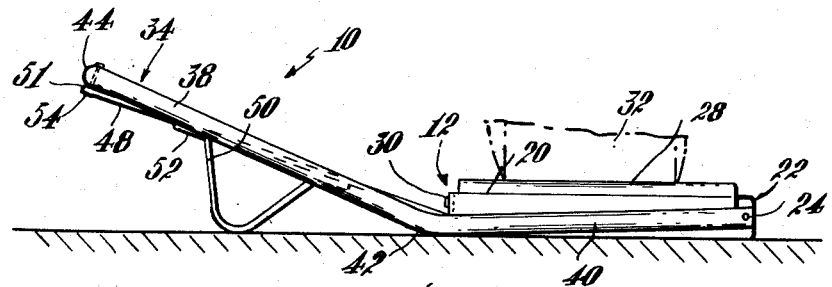
Fig. 1
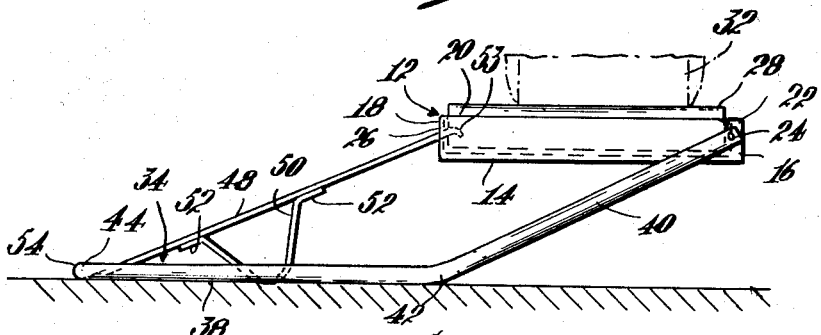
Fig. 2
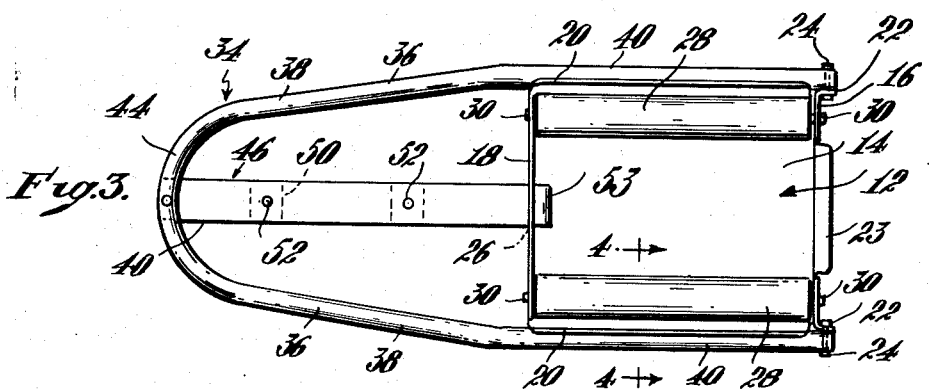
Fig. 3
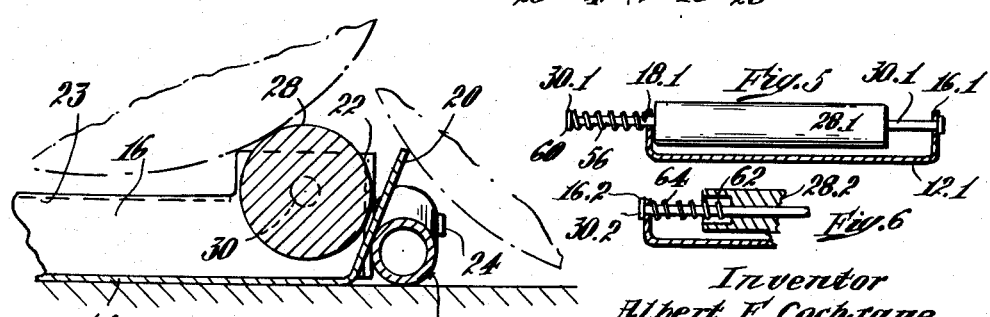
Fig. 4
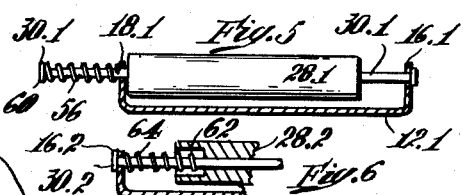
Fig. 5
Fig. 6
Inventor
Albert F. Cochrane
by Roberts, Cushman & Grover
Att'ys

United States Patent Office 3,069,036
Patented Dec. 18, 1962

3,069,036
WHEEL LIFT
Albert F. Cochrane, 25 New Castle Road,
Brighton 35, Mass.
Filed Mar. 31, 1960, Ser. No. 18,912
10 Claims. (Cl. 214—332)

This invention relates to apparatus for use in changing vehicle wheels and more particularly to a device for lifting and holding a wheel and tire mounted thereon in a position to be secured to the wheel hub.

Changing tires currently comprises changing the wheel with the tire mounted on it and this involves removing nuts from the lugs on the wheel hub so that the wheel disc can be pulled off and then remounting another wheel and tire. The wheel disc and tire are quite heavy so that replacement becomes quite difficult because of the necessity of trying to hold the wheel at arms length up to the hub with both hands and at the same time trying to align the holes in the wheel disc with the lugs on the hub, and because of the awkward kneeling position required for performing the operation.

It is an object of this invention to provide convenient and simply operated apparatus for supporting and positioning a vehicle wheel to be remounted on the wheel hub; to provide such an apparatus which can be used for remounting a vehicle wheel without risk or injury; and to provide such an apparatus which is simple and inexpensive to manufacture.

The apparatus provided by this invention, briefly described, comprises a frame having elements disposed therein for receiving and supporting a wheel, and rocker means engaged at one end with the frame and adapted to be rocked when depressed at the other end for elevating the frame to position the wheel while maintaining the wheel-supporting disposition of the frame elements.

In a practical embodiment of this invention, the frame is provided with a pair of horizontally disposed rollers for receiving and supporting a wheel, the rollers being mounted for rotation and optionally for sliding axial movement so that a wheel supported on the rollers can be rotated on its axis to align the wheel disc holes with wheel mounting studs on a wheel hub, and so that the wheel can be moved axially along the frame for fitting the wheel holes over the wheel mounting studs. Preferably a rocker member, having a pair of substantially parallel rocker arms, which are connected at one end by a cross-piece, pivotally supports the frame between the other ends of the rocker arms. A separate rocker member is engaged at one end with said cross-piece for movement therewith and is engaged at its other end with the frame, whereby when the cross-piece is depressed both rocker members will be rocked at the same time, the rocker members being adapted to elevate all portions of the frame equally to maintain the wheel-supporting disposition of the frame rollers.

Other objects, advantages and details of construction of the apparatus provided by this invention will appear in the following description which refers to the drawings and in which:

FIG. 1 is a side elevation of the wheel positioning apparatus showing a wheel resting on the apparatus ready to be raised up to the wheel hub;

FIG. 2 is a side elevation similar to FIG. 1, showing the apparatus raised to support a wheel in a position to be secured to the wheel hub;

FIG. 3 is a plan view of the apparatus;

FIG. 4 is a section taken on the line 4—4 of FIG. 3; and

FIGS. 5 and 6 are elevations of one of the rollers with modified mounting means therefor.

Referring to the drawings (FIGS. 1 to 4), 10 indicates the wheel positioning apparatus provided by this invention which includes a frame 12 having a flat bottom 14, having marginal upstanding flanges 16 and 18 at the frame ends, and having marginal upstanding flanges 20—20 at the frame sides. The flange 16 is bent outwardly at its ends to provide ears 22—22 for mounting pivot pins 24—24 adjacent the frame sides and may have an intermediate bent portion 23 for strengthening the frame at that end. The flange 18, at the other end of the frame, has a centrally located aperture 26, for a purpose to be described below. A pair of rollers 28—28 are disposed in spaced relation on the frame with their axes horizontal and parallel and extending along the respective frame sides, each roller being mounted for rotation on pivot pins or spindles 30—30 which are fixedly secured to and axially extend from each end of the roller. The pivot pins 30—30 are mounted in the frame end flanges 16 and 18 respectively, for rotatably mounting the rollers 28—28.

As shown in FIG. 1, a wheel, such as an automobile wheel having a tire mounted thereon, can be rolled onto the frame portion of the wheel positioning apparatus and to be supported by the frame rollers 28—28. Preferably the side flanges 20—20 extend upwardly and outwardly, as shown particularly in FIG. 4, to engage a wheel being rolled onto the frame and to provide traction permitting the wheel to ride upwardly and onto the frame rollers.

A rocker member 34 having a pair of substantially parallel rocker arms 36—36, each of which has angularly disposed portions 38 and 40 meeting at 42 and having a cross-piece 44 connecting the portion 38 at one end of the member, is pivotally connected at the ends of the portions 40—40 to the pivot pins 24—24, so that the frame 12 is rotatable on the axis of the pins 24—24.

A separate rocker member 46 comprising a lever portion 48 and a V-shaped rocker portion 50, mounted thereon by means of rivets 52, is loosely connected at one end 51 by means of a pin 54 to the cross-piece 44 and is slidably engaged at its other end within the frame flange aperture 26. Preferably the slidably engaged end of the member is bent slightly as at 53 for preventing removal of this member from within the frame aperture.

In this construction, when the wheel positioning apparatus is disposed in the position shown in FIG. 1, and a wheel has been rolled onto the frame portion of the apparatus to be supported by the frame rollers 28—28, the cross-piece 44 of the rocker member 34, and therefore the end 51 of the rocker member 46 which is connected to the cross-piece, can be conveniently depressed either by stepping upon or kneeling upon the cross-piece for elevating the frame portion of the apparatus to the position shown in FIG. 2. Since the cross-piece is disposed in a convenient position to be depressed and can be depressed without requiring that a person remounting the wheel place himself in an awkward stooping position very close to the vehicle this apparatus permits convenient remounting of a vehicle wheel without risk of injury caused by slipping of the vehicle from the elevating jack. It will be understood that the rocker members 34 and 46 are proportioned for elevating all portions of the apparatus frame to an equal extent to maintain the horizontal wheel-supporting disposition of the frame 28—28. It will also be understood that the apparatus is proportioned to elevate the wheel to a reasonable height for aligning the wheel disc with a wheel hub (not shown) on which the wheel is to be mounted, but that, when the cross-piece 44 is depressed to a lesser extent than is shown in FIG. 2, the extent to which the wheel is elevated by the apparatus can be adjusted to provide convenient alignment with the wheel hub. Since the wheel is supported entirely by means of contact with the frame rollers 28—28 the wheel can be conveniently rotated about its axis for aligning the usual mounting holes in the wheel (not shown) with wheel mounting studs conventionally provided on the wheel hub. When the wheel axis has been aligned with the wheel hub, and when wheel holes have been aligned with wheel mounting studs provided on the hub, the wheel can be slid along the rollers 28—28 to one end of the frame for fitting the wheel holes over the wheel mounting studs. Enclosure of the apparatus rollers by the flat-bottomed frame restricts fouling of the rollers with mud etc. during use.

Alternative embodiments of this invention will be described below with reference to FIGS. 5 and 6 wherein numbers are used to identify members which are similar in function to members described with reference to FIGS. 1 to 4 inclusive. In FIG. 5 there is illustrated an alternative embodiment of this invention, wherein the frame rollers 28.1, although of sufficient length to receive and support a wheel of the size for which the apparatus is designed, are of a length substantially shorter than the distance between the frame and flanges 16.1 and 18.1 and the pivot pins 30.1—30.1 secured to the rollers are slidably and rotatably mounted in respective frame flanges 16.1 and 18.1. A helical coil spring 56 is fitted over one of the pivot pins 30.1 on each roller and is adapted to engage the frame flange 18.1 and a shoulder 60 on one of said pivot pins on each roller for biasing the rollers to remain normally at one end of the frame portion of the apparatus to receive and support a wheel. In this construction, when the frame portion of the apparatus has been elevated, as in the embodiment of this invention previously described, and the wheel mounting holes have been aligned with the studs on the wheel hub, the wheel can be moved axially toward the other end of the frame for fitting the wheel holes over the wheel mounting studs, the pivot pins supporting the frame rollers sliding within the frame flanges 16.1 and 18.1.

In FIG. 6, a pin 30.2 is provided for each roller 28.2 and is fixedly secured at either end to the frame flanges 16.2 and 18.2 respectively. Each roller 28.2 is rotatably mounted on the pivot pin 30.2 and is provided with a recess 62 at one end thereof for receiving an helical coil spring 64. The spring 64 is fitted around the pivot pin 30.2 and is adapted to engage the frame flange 18.2 and the roller 28.2 for biasing the rollers toward one end of the frame 28.2 to receive and support a wheel. In this construction, when the wheel has been elevated as in the embodiments of this invention previously described, and the wheel mounting holes have been aligned with the studs on the wheel hub, the wheel can be moved toward the other end of the frame for fitting the wheel holes over the mounting studs, the frame rollers 28.2 sliding on the pivot pins 30.2.

It should be understood that the present disclosure is for the purpose of illustration only and that this invention includes all modifications and equivalents which fall within the scope of the appended claims.

I claim:

1. Wheel positioning apparatus comprising a flat-bottomed frame having two sides and two ends and marginal upstanding flanges extending along said sides and ends, a pair of rollers horizontally disposed on the frame in spaced parallel relation extending along respective frame sides for receiving and supporting a wheel, said rollers being mounted for rotation and for sliding axial movement toward one end of the frame so that said wheel can be rotated on its axis and moved axially toward said one frame end while supported on said rollers, spring means biasing said rollers toward the other frame end to receive said wheel, said frame having an aperture in the marginal flange of said other frame end, a rocker member having a pair of substantially parallel rocker arms and a cross-piece connecting the arms at one end, said arms pivotally engaging respective frame sides adjacent said one frame end for pivotally supporting the frame therebetween, said arms extending along said frame sides beyond said other frame end for disposing said cross-piece in position to be depressed, a separate rocker member connected at one end to said cross-piece for movement therewith and having its other end slidably engaged within said frame aperture, said rocker members being adapted to be rocked in unison when said cross-piece is depressed for elevating all portions of said frame equally to maintain the wheel-supporting disposition of said rollers, thereby to position said wheel.

2. Wheel positioning apparatus as set forth in claim 1, wherein said frame side flanges extend upwardly to a sufficient extent to engage a wheel being rolled onto said rollers, thereby to provide traction for rolling said wheel onto the rollers.

3. Wheel positioning apparatus comprising, first and second arms of different length, means loosely connecting an end of the first arm to an end of the second arm so that the two arms extend in the same direction from said connecting means and the distal ends of the arms are offset by the difference between the lengths of the arms, a wheel support, having opposite ends, situated between and connected to the distal ends of the arms, and rockers on the arms, intermediate their ends, operable, by downward displacement of the connected ends of the arms, to raise the distal ends of the arms and hence the wheel support, said rockers being offset relative to each other and said arms being so proportioned that, when rocked on said rockers, the distal ends of the arms will rise to substantially the same level.

4. Wheel positioning apparatus comprising a first arm having spaced parallel limbs, a second arm disposed between the limbs of the first arm, means loosely connecting an end of the second arm to an end of the first arm, said arms being of different length so that the distal ends of the limbs of the first arm and the second arm are offset by an amount corresponding to the difference between their lengths, a wheel support disposed between the limbs of the first arm, means connecting the distal ends of the limbs of the first arm to one side of the frame and the distal end of the second arm to the opposite side of the frame, knees on each of the arms intermediate their ends operable, by depression of the connected ends of the arms, to elevate the distal ends of the arms and, in turn, to elevate the wheel support connected thereto, said arms being so proportioned relative to each other and to the knees as to effect elevation of the distal ends to the same level and hence to maintain the wheel support horizontal throughout elevation.

5. Wheel positioning apparatus comprising a first arm of predetermined length having spaced parallel limbs, a second arm of shorter length disposed between the limbs of the first arm, means loosely connecting the ends of the first and second arms so that the second arm extends from the place of connection to the first arm in the same direction as the limbs of the first arm, the distal ends of the ends of the limbs and the second arm being offset by the difference in length of the first and second arms, a wheel support corresponding substantially in width to the distance between the limbs situated between the limbs, means connecting one end of the wheel support to the distal ends of the limbs and the other end to the distal end of the second arm, a knee on each of the limbs of the first arm and a knee on the second arm, said knees being situated between the ends of the arms and operable, by depression of the connected ends of the arms, to elevate the distal ends of the arms and, in turn, to elevate the wheel support connected thereto, said arms being so proportioned relative to each other and to the knees as to effect elevation of the distal ends to the same level.

6. Wheel positioning apparatus comprising a substantially U-shaped arm of predetermined length having spaced parallel limbs, a second arm of shorter length disposed between the limbs of the U-shaped arm with one end loosely connected to the bight of the U-shaped arm and with its distal end offset relative to the distal end of the limbs by an amount corresponding to the difference in length of the arms, a substantially rectangular wheel supporting frame disposed in the space between the limbs of the U-shaped arm and the distal end of the second arm, means connecting the opposite sides of the frame to the distal ends of the limbs and the distal end of the second arm, knees on the limbs and the second arm intermediate their ends, the knee on the second arm being offset from the knees of the limbs and operable, by depression of the connected ends of the arms, to raise the distal ends of the arms upwardly, said arms being of such length relative to each other and to the knees as to effect elevation of the distal ends of the arms a corresponding amount and hence maintenance of the ends of the wheel supporting frame in a predetermined position throughout elevation.

7. Wheel positioning apparatus tcomprising a substantially U-shaped frame having spaced parallel limbs bent intermediate their ends to form rocker means, a straight arm disposed between the limbs of the U-shaped arm, means loosely connecting one end of the straight arm to the bight of the U-shaped arm, said straight arm being shorter than the limbs of the U-shaped arm, so that its distal end is displaced relative to the distal ends of the limbs, a rigid wheel supporting frame disposed between the limbs and the straight arm, means pivotally connecting one edge of the frame to the distal ends of the limbs, means slidably connecting the other edge of the frame to the distal end of the straight arm, and a rocker knee on the straight arm, intermediate its ends, cooperable with the knees on the limbs of the U-shaped arm to effect movement of the distal ends of the arms a corresponding amount when the connected ends of the arms are depressed.

8. Apparatus according to claim 6, comprising transversely spaced, parallel rollers on the wheel support mounted for rotation about axes parallel to the arms.

9. Apparatus according to claim 6, comprising spaced parallel, elongate rollers and means on the wheel support supporting said rollers for rotation and axial movement on axes parallel to the arms.

10. Apparatus according to claim 6, comprising spaced parallel rods on the wheel support parallel to the arms, an elongate roller mounted on each rod for rotation thereon and for movement axially along the rod, and spring means normally holding the rollers displaced rearwardly with respect to the forward end of the apparatus.

References Cited in the file of this patent
UNITED STATES PATENTS

| | | |
|---|---|---|
| 2,551,483 | Bartoe | May 1, 1951 |
| 2,877,912 | DiGiacomo | Mar. 17, 1959 |

FOREIGN PATENTS

| | | |
|---|---|---|
| 190,577 | Switzerland | July 29, 1936 |